W. STERNBERG.
TOBACCO TRANSPORTING RACK.
No. 10,560. Reissued Feb. 10, 1885.
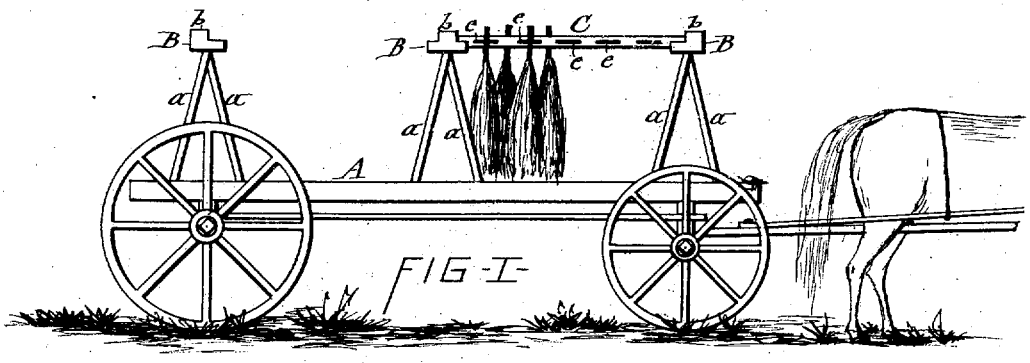
FIG-I-
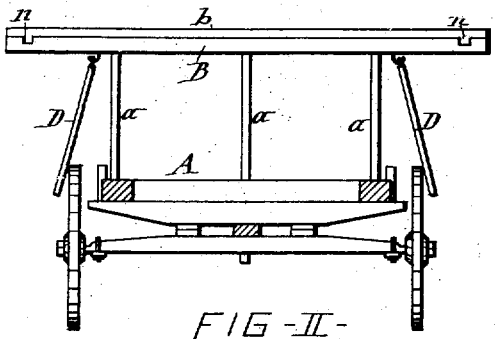
FIG-II-
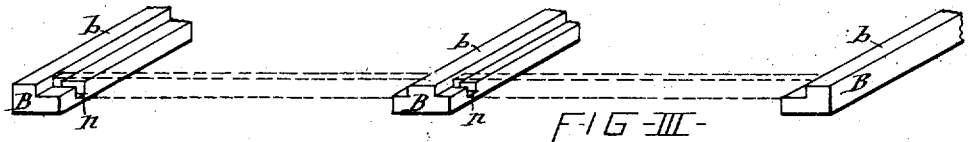
FIG-III-
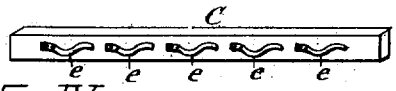
FIG-IV-
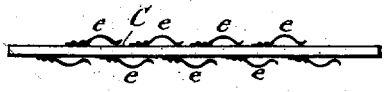
FIG-V-
WITNESSES:
C. Bendixson
Wm. C. Raymond.
INVENTOR:
William Sternberg
per Duell, Laass & Hey
his Attys.
N. PETERS. Photo-Lithographer, Washington, D. C.

UNITED STATES PATENT OFFICE.

WILLIAM STERNBERG, OF CICERO, NEW YORK.

TOBACCO-TRANSPORTING RACK.

SPECIFICATION forming part of Reissued Letters Patent No. 10,560, dated February 10, 1885.

Original No. 298,252, dated May 6, 1884. Application for reissue filed August 15, 1884.

*To all whom it may concern:*

Be it known that I, WILLIAM STERNBERG, of Cicero, in the county of Onondaga, in the State of New York, have invented new and useful Improvements in Tobacco-Transporting Racks, of which the following, taken in connection with the accompanying drawings, is a full, clear, and exact description.

This invention consists in a novel, simple, and comparatively inexpensive construction of a portable rack, which greatly facilitates the labor of gathering the tobacco in the field, and is capable of carrying the same safely from the field to the barn or tobacco-house, and, furthermore, avoids injury to the plants hitherto caused by the splitting of the stalk thereof in attaching them to the carrying-bar.

The invention is fully illustrated in the annexed drawings, wherein Figure I is a side elevation of my improved tobacco-plant-transporting apparatus. Fig. II is a central transverse section of the same. Fig. III is an isometric view of the ends of the rack-skids, showing the means of retaining the tobacco-carrying bars in position while applying thereto the tobacco-plants. Fig. IV is a perspective view of the tobacco-carrying bar, and Fig. V is a top view of the same.

Similar letters of reference indicate corresponding parts.

A represents a horizontal frame or platform mounted on a wagon in lieu of and in a manner similar to the body of a hay-rack. On suitable standards, *a a*, secured to the platform A, are mounted skids or bars B, arranged horizontal and parallel to each other and transversely or crosswise the wagon, the skids being of sufficient length to project over the sides of the wagon, for the purpose hereinafter explained. The standards *a a* carry the skids B at the requisite elevation above the platform A to allow the tobacco-plant to be suspended from the skids without touching the platform, and thus preserve the plants from injury during the transportation of the same from the field. The skids are provided with longitudinal guides *b*, to retain thereon the tobacco-carrying bars C, which ride with their ends on the skids and abut against the guides thereof. The ends of the skids are provided with a notch, *n*, or other suitable locking device, which the end of the bar C enters, and is thereby confined in its position on the skid while applying the tobacco-plants to said bar.

Hitherto the tobacco-carrying bars consisted of a plain stick pointed at the ends, by which they were passed into a slit in the stalk of the tobacco, which latter became thus attached to the bar. This mode of attaching the plants is not only slow, tedious, and laborious, but also subjects the plants to so much handling as to injure them to a greater or less extent, and furthermore, the splitting of the stalk causes the plant to dry out too quickly to allow it to properly mature, thereby making the tobacco light-colored, and impairing its quality. To obviate this I apply to the bar C suitable fastening devices, *e e*, which may consist either of spring-clasps, as shown, or of hooks or other means for readily engaging or grasping the shanks of tobacco-plants, and in order to facilitate and expedite the removal of the plants from the bar C when desired I arrange the fastening devices *e e* lengthwise and with their free ends all pointing toward one and the same end of the bar, as illustrated in Figs. IV and V of the drawings. This arrangement allows all of the plants to be removed from the bar at one operation by the operator reaching from one end of the bar around the plants on the opposite end of the bar and gathering all the plants to him.

In using my improvement, the wagon carrying the rack A *a* B is taken to the field and to the place where the tobacco-plants are to be cut. Then the bar C is laid with its ends on the ends of two of the skids B B, and secured in position by entering the ends of the bar in the notches *n*, or other locking devices on the skids. Then the plants are to be cut and immediately hung by their shanks onto the clasps or fastening devices *e e* on the bar C, and when thus loaded said bar is lifted out of the notches *n* and shifted along on the skids B toward the center of the rack, and another bar, C, is placed onto the ends of the skids preparatory to applying thereto another lot of cut plants, and in this manner the several skids are loaded. The loading may be carried on at both sides of the wagon when desired.

In order to protect those plants which in loading have to pass over the wheels of the wagon, I hang onto the under side of the skids B an apron, D, which hangs over the outside of the upper portion of the wheel, as illustrated in Fig. II of the drawings.

Having described my invention, what I claim as new, and desire to secure by Letters Patent, is--

1. The combination, with a wagon-rack, of parallel horizontal skids carried elevated and transversely on the rack and projecting over the sides thereof, longitudinal guides on the skids, locking devices on the ends of the skids for retaining one of the tobacco-carrying bars, and bars adapted to ride on the skids, and provided with fastening devices for attaching thereto the tobacco-plants, substantially as described and shown.

2. In combination with the wagon and tobacco-rack mounted thereon, the apron D, suspended from the rack and hanging over the outside of the wheels, substantially in the manner specified and shown.

3. The combination, with the tobacco-carrying bar, of plant-fastening devices secured lengthwise thereon, and all arranged with their free ends pointing toward one and the same end of the bar, substantially as described and shown, for the purpose specified.

WILLIAM STERNBERG.

Witnesses:
F. H. GIBBS,
WM. C. RAYMOND.